(12) United States Patent
Hammacher et al.

(10) Patent No.: US 10,259,660 B2
(45) Date of Patent: Apr. 16, 2019

(54) METHOD AND DEVICE FOR CONVEYING AND GROUPING FRAGMENTED PRODUCTS

(71) Applicant: LOESCH Verpackungstechnik GmbH, Altendorf (DE)

(72) Inventors: Heinz-Peter Hammacher, Bamberg (DE); Roland Pleichinger, Kirchehrenbach (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 0 days.

(21) Appl. No.: 15/106,248

(22) PCT Filed: Dec. 15, 2014

(86) PCT No.: PCT/EP2014/077745
§ 371 (c)(1),
(2) Date: Jun. 17, 2016

(87) PCT Pub. No.: WO2015/091350
PCT Pub. Date: Jun. 25, 2015

(65) Prior Publication Data
US 2016/0318715 A1    Nov. 3, 2016

(30) Foreign Application Priority Data
Dec. 19, 2013 (DE) .......... 10 2013 226 783

(51) Int. Cl.
*B65G 47/08* (2006.01)
*B65G 47/26* (2006.01)

(52) U.S. Cl.
CPC .... *B65G 47/084* (2013.01); *B65G 2201/0202* (2013.01); *B65G 2201/0205* (2013.01); *B65G 2811/0605* (2013.01)

(58) Field of Classification Search
CPC ...... B65G 47/29; B65G 47/08; B65G 47/082; B65G 47/084
(Continued)

(56) References Cited

U.S. PATENT DOCUMENTS 3,460,667 A   8/1969 Lanham
3,528,537 A   9/1970 Schultz et al.
(Continued)

FOREIGN PATENT DOCUMENTS

CN   101014518 A   8/2007
CN   101506067 A   8/2009
(Continued)

OTHER PUBLICATIONS

International Search Report for PCTEP2014/077745 from International Bureau; Searching Authority: European Patent Office.

*Primary Examiner* — Gene O Crawford
*Assistant Examiner* — Lester Ill Rushin
(74) *Attorney, Agent, or Firm* — Cislo & Thomas, LLP

(57) ABSTRACT

A method and device for conveying and grouping products by supplying the products in a first conveying direction on a track by a first conveying device, wherein the products are located one behind another at arbitrary spacings; grouping the products on the track by a grouping device so that a defined number of products are arranged at defined spacings one behind another in a formed product group on the track behind the grouping device in the conveying direction; and transferring the formed product group to a second conveying device for forwarding in a second conveying direction so that the products maintain their relative alignment at the defined spacings with respect to one another in the formed product group and are essentially located side by side in a
(Continued)

Figure 1:
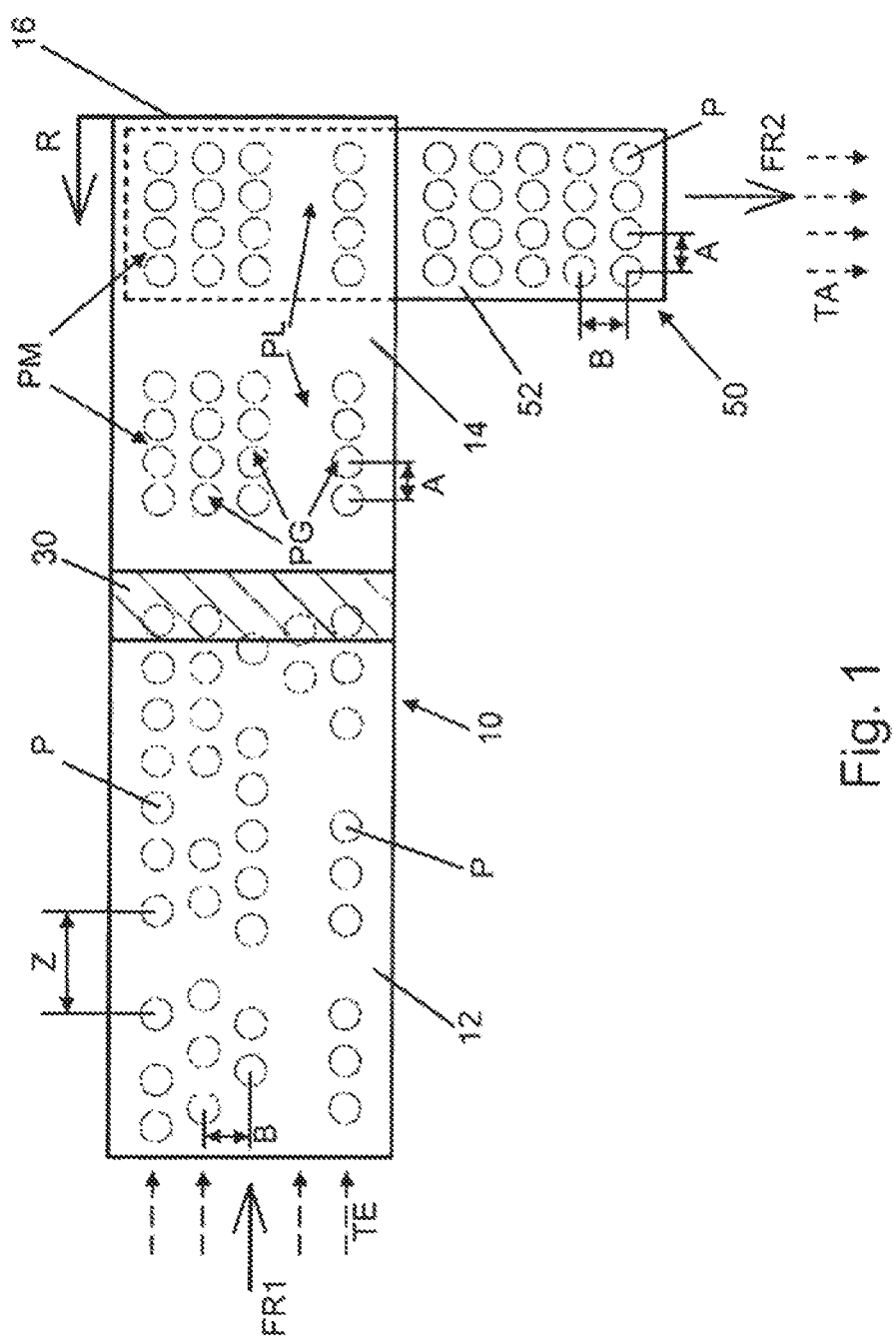

row. In a multiple-track embodiment, a product matrix is formed from several product groups which are located side by side.

17 Claims, 3 Drawing Sheets

(58) Field of Classification Search
USPC .................................. 198/426, 431, 432, 433
See application file for complete search history.

(56) References Cited

U.S. PATENT DOCUMENTS

| | | | |
|---|---|---|---|
| 3,529,711 A | 9/1970 | Moeller | |
| 4,371,076 A * | 2/1983 | Nakao | B65B 35/54 |
| | | | 198/418.2 |
| 4,684,008 A * | 8/1987 | Hayashi | B65G 47/71 |
| | | | 198/431 |
| 4,892,181 A | 1/1990 | Hogenkamp | |
| 7,021,450 B2 * | 4/2006 | Jones, Jr. | B65G 21/14 |
| | | | 198/418.9 |
| 7,578,232 B2 * | 8/2009 | Hayashi | A21C 3/065 |
| | | | 99/353 |
| 7,740,123 B2 * | 6/2010 | Lopez Fernandez | B65B 35/52 |
| | | | 198/418.5 |
| 8,002,105 B2 * | 8/2011 | Duchemin | B65G 47/29 |
| | | | 198/419.2 |
| 8,322,514 B2 * | 12/2012 | Bonnain | B65B 21/06 |
| | | | 198/430 |
| 9,539,725 B2 * | 1/2017 | Subotincic | B25J 9/1612 |
| 2005/0068869 A1 | 3/2005 | Sugiyama et al. | |
| 2006/0131131 A1 | 6/2006 | Mayer | |
| 2008/0099307 A1 | 5/2008 | Fleck et al. | |
| 2010/0051416 A1 | 3/2010 | De Jong | |
| 2010/0163368 A1 | 7/2010 | Duchemin | |
| 2013/0239523 A1 | 9/2013 | Scudder et al. | |

FOREIGN PATENT DOCUMENTS

| | | |
|---|---|---|
| DE | 15 56 704 | 2/1970 |
| DE | 15 56 704 A1 | 2/1970 |
| EP | 0284835 | 10/1988 |
| EP | 1 683 746 A2 | 7/2006 |
| WO | WO 03/057602 | 7/2003 |
| WO | WO/2012/038475 A2 | 3/2012 |
| WO | WO 2013/152798 | 10/2013 |

* cited by examiner

METHOD AND DEVICE FOR CONVEYING AND GROUPING FRAGMENTED PRODUCTS

The invention relates to a method and a device for conveying and grouping fragmented products in such a manner that the products are singled out from a product flow on one or several conveyor tracks which are arranged side by side and are combined to form product groups or a defined product matrix which extends all the conveyor paths.

The invention relates to a method and a device for conveying and grouping fragmented products, as can be used, for example, in conjunction with a packaging machine, by means of which the fragmented products are packaged. The products can be, for example, sensitive products from the confectionery or long-life bakery industry, such as, for examples biscuits, chocolate products and the like. Along with products from the foodstuffs industry, also conceivable are technical products, for example, such as electronic or electro-technical components, machine elements, pharmaceutical or medical products and the like which are typically produced and marketed in large quantities.

In particular, in the case of packaging machines for confectionary or long-life bakery products it is typically necessary for the individual products to be supplied in a regular and ordered manner to a packaging station or to another further processing station. In this connection, it is consequently necessary to separate the individual products from a more or less irregular supplied product stream and to combine them to form regular, ordered product groups or product matrices or product layers in which the products are arranged side by side and/or one behind another preferably at constant, identical spacings with respect to one another. The product groups or product matrices formed in this manner are then to foe conveyed further essentially maintaining their overall form or the relative arrangement or alignment between the individual products with respect to one another inside the product group or product matrix.

WO 2012/038475 A2 discloses, for example, a method and a device for filling a multi-row packaging tray with fragmented products, in particular a so-called tray loading packaging machine. Consecutive rows of individual products which are arranged side by side and are aligned precisely with one another transversely with respect to the conveying direction are formed in the case of said known packaging machine. Said single-row product group is transferred to a packaging tray at the end of a conveying section, the individual products, located side by side, of a row being transferred simultaneously into several compartments, arranged side by side, of the packaging tray. The present invention can be used, for example, within the framework of this type of packaging machine.

WO 2013/153798 A1 describes a device and a method for conveying fragmented products. In this connection, the products are aligned with one another in a predefined manner on several conveyor tracks which are arranged side by side such that arbitrary patterns of product groups or product layers or product matrices are created, such types of product patterns or product groups, insofar as desired and necessary, also being able to comprise gaps or blank spaces i.e. positions inside such a product group which are not occupied by a product. In the case of said known method and said known device, the respective position or an individual product inside the product group or product matrix can be precisely chosen and actuated both in a track-manner and a row-manner (i.e. transversely with respect to the conveyor tracks) such that the individual products and, where applicable, product gaps or product blank spaces to be formed, can be aligned precisely with one another corresponding to the pattern to be created.

In the case of said known methods and devices for conveying and grouping fragmented products the problem arises, in principle, of the formed product group or product matrix having to maintain its form and in particular the relative alignment of the individual products with respect to one another inside the product matrix or product group as the further conveying progresses so that said produce group ox product matrix is able to be supplied in its ordered form to a next method step, for example for the regular and simultaneous filling of individual compartments or rows of compartments of a packaging tray with the individual products or product rows. To do this, a regular and ordered, where applicable identical fill level has accordingly to for provided on the several product tracks arranged side by side for the subsequent process step (e.g. packaging step).

The maintaining of the overall form of a formed product group or product matrix required for this causes particular problems when the conveying section changes its direction. Thus, for example, if there is a curve in the conveying section, the product group can become distorted such that, following the curve, the product group no longer comprises its original form and alignment, or the products are no longer located in an ordered, regular manner side by side and/or one behind another inside product matrix. This can occur, for example, at different carve speeds or angular speeds at which the individual products are moved inside a product matrix oh their tracks in a curve in the conveying section.

In order to achieve a regular fill level of several product tracks which extend in parallel and in particular to maintain the form and alignment of a formed product group or product matrix for a process connected downstream when there is a direction change in the conveying section when the individual products are supplied from a process connected upstream in an irregular manner and/or at arbitrary spacings with respect to one another, various measures are disclosed in the prior art:

Using a so-called "transfer robot" a correction between the tracks arranged side by side can be effected as a result of transferring products from tracks with a higher fill level to tracks with a lower fill level. However, the problem here is introducing the transferred products into the product stream of the respective conveyor track. In the case of sensitive products (such as, for example, biscuits, in particular double-layer biscuits with cream filling) over and above this there is also the risk of damage (e.g. lifting a biscuit layer or topping) caused by gripping devices of the robot or in the event of the product being sucked up. Consequently, transfer by means of a robot is not possible as a rule in the case of sensitive products.

In the case of another known measure, the products are moved from a conveyor belt onto an "air bed", where air flows into the conveyor track from below, for example through a perforated plate, and lifts the products slightly such that the products quasi float on an air bed. The products, in this case, are jammed against one another on the plate (i.e. the products "jostle" on the plate). The same applies to guide devices which are to enable removal of products onto several tracks. The fill level of the delivery tracks is regulated in this case, for example, by means of the dynamic pressure on the conveying section of the products. In this connection, there is consequently unwanted contact between the products themselves and between the products and the surrounding guide elements. This results, once again, in the risk of damaging the products as wall as in the problem of contaminating the conveying devices as a result of product abrasion and/or product fragments.

In addition, it is known in the prior art to guide products by way of side guides and switchable baffle plates (so-called "flippers") out of a supplied (irregular) product stream onto a desired number of conveyor tracks. Insofar as individual tracks are filled in an irregular manner, the baffle plates are then switched and the products correspondingly guided onto other tracks which up to now have been underfilled. Said method, however, is too sluggish and/or too slow for certain applications. Where there are a larger number of tracks arranged side by side, redistribution of the products is additionally sometimes only possible at a high cost.

Finally, it is also known in the prior art to achieve a correction of fill levels in the feed tracks by transferring out products from overfilled tracks. In this connection, however, there is possibly a large, unwanted quantity of products which are transferred out and consequently will not be packaged ultimately, for example, in a packaging machine though said products have no defects per se.

Proceeding from said known devices and methods, the object underlying the invention is to overcome the above-described disadvantages of the prior art and consequently to create an improved method and an improved device for conveying and grouping fragmented products. In particular, a method and a device are to be created which accomplish a regular, where applicable identical fill level of several product conveyor tracks arranged side by side for a process (e.g. a packaging process) connected downstream (on the output side), when from a process connected upstream (on the input side) a more or less irregular product stream is supplied in which the products are located, for example, at arbitrary spacings one behind another and/or side by side or where individual products or entire product rows are missing. The requirement for a regular fill level on the output-side product tracks also includes the requirement that a regular or irregular product group or product matrix, formed in the conveying section, still comprises its defined form and alignment even after a direction change of the conveying section.

Over and above this, a method and a device are preferably to be created which enable individual products of different feed tracks (which comprise, for example, different product qualities or features) to be mixed. Finally, a method and a device axe to be created which enable a change in the number of input-side feed tracks to an arbitrary other number of output-side tracks on which the products will be delivered to the next process step.

Consequently, a method and a device for conveying and grouping fragmented products are created according to the invention, said method and device comprising the following method steps and device features: supply the products in a first conveying direction on a track by means of a first conveying device, wherein the products are located one behind another at arbitrary spacings on the track in the conveying direction; group the products on the track by means of a grouping device in such a manner that a defined number of products are arranged in a group behind the grouping device in the conveying direction, wherein the products in each group are arranged at defined spacings one behind another on the track in the conveying direction; forward the formed product group in the first conveying direction by means of the first conveying device; and transfer the formed product group to a second conveying device for forwarding the products in a second conveying direction in such a manner that the products maintain their relative alignment at the defined spacings with respect to one another in the product group and are essentially located side by side in a row.

For a multi track or multi-row embodiment, a method and a device for conveying and grouping fragmented products are created according to the invention, where the products are supplied by means of a first conveying device in the first conveying direction on several tracks which are arranged at substantially identical spacings side by side and are substantially parallel to one another, wherein product groups are formed on each track by means of a grouping device, wherein the forming of the product groups on the individual tracks is synchronized with one another in such a manner that in the conveying direction behind the grouping devices of the tracks which are arranged side by side, a defined product matrix is formed in which the products are arranged on the tracks in the conveying direction at defined spacings one behind another and in rows side by side at the track spacings or at an integer multiple thereof, and wherein the product matrix formed in the first conveying device is transferred in such a manner to the second conveying device that the products maintain their relative alignment with respect to one another in the product matrix in such a manner that the products, which prior to the transfer are arranged side by side in a row in the product matrix in the first conveying device, after the transfer are arranged one behind another in the product matrix on a track in the second conveying device at defined spacings which correspond to the track spacings of the first conveying device or to an integer multiple thereof.

In a particular embodiment of the multi-row conveying and grouping method according to the invention as well as of the associated device, a separate grouping device is present for each track of products supplied on the first conveying device, wherein control devices for synchronizing said individual grouping devices with one another are provided for forming the product matrix. In said case, the forcing of the product groups on the individual tracks in the first conveying device for forming the product matrix can fee synchronized with one another in such a manner that individual entire tracks in the product matrix are not occupied by products when no products or too few products for the forcing of a complete product group are supplied in front of the grouping devices on the relevant tracks.

In the named embodiment according to the invention, in which a separate grouping device is present for each track of the first conveying device, as an alternative to this the grouping devices on the individual tracks can also be controlled and synchronized in such a manner with one another for forming the product matrix that individual defined positions in the product matrix are not occupied by products such that, corresponding to the requirements provided in each case, a regular or irregular product matrix is formed which comprises the corresponding product gaps.

In a further particular embodiment of the invention, the conveying and grouping device comprised a so-called "pull nose belt", which is characterized in that the first conveying device comprises at least one circulating conveyor belt for conveying the products in the first conveying direction, wherein the conveyor belt comprises a front end in the conveying direction which is arranged in a region above the second conveying device and which can be pulled back from here in opposition to the first conveying direction, whilst the conveyor belt continues conveying the products in the first conveying direction, wherein the transfer of the products to the second conveying device is effected as a result of the front end of the conveyor belt being pulled back when a complete product group or product matrix reaches the front end of the conveyor belt, and wherein once the products have been transferred to the second conveying device, the front end of the conveyor belt is advanced out of the pulled-back position again into the region above the second conveying device.

With the method according to the invention and the device according to the invention it is consequently possible to form arbitrary, regular or irregular patterns of product groups or product matrices or product layers which can be transferred from a first conveying device to a second conveying device whilst maintaining said formed pattern, i.e. the relative arrangement between the individual products inside the product group or product matrix, the conveying directions of the two consecutive conveying devices differing from one another. In one embodiment of the invention, the two conveying directions extend in particular perpendicularly to one another, i.e. the product is conveyed at a substantially 90° deflection.

It is consequently possible, as a result of the invention, also to accomplish in particular a regular, where applicable identical fill level of several out-put-side product tracks for a processing step connected downstream (e.g. a packaging process) when, on the input side, an irregular product stream is supplied from a process step connected upstream, i.e. a product stream in which, for example, individual products or entire product rows or product tracks are absent in portions or completely. A product correction can be created to a certain extent on the tracks or in the rows in this way.

Over and above this, it is possible according to the invention to mix products from different feed tracks, which, for example, is relevant in the case of products from the different input-side feed trades with unequal qualities or features, for example where individual baked goods have different degrees of browning or weights.

Finally, by means of the method according to the invention and the associated device, the number of input-side product tracks can be changed to an arbitrary other number of output-side product tracks, in particular without the individual products on the individual tracks knocking against one another. As a result, the products are treated gently, which can be relevant in particular in the case of baked goods.

Further details and advantages of the invention result from the following detailed description of different exemplary embodiments by way of the accompanying drawings.

FIG. 1 shows a schematic representation of a view from above of the conveying and grouping device according to the invention with products arranged thereon.

Figure 2:
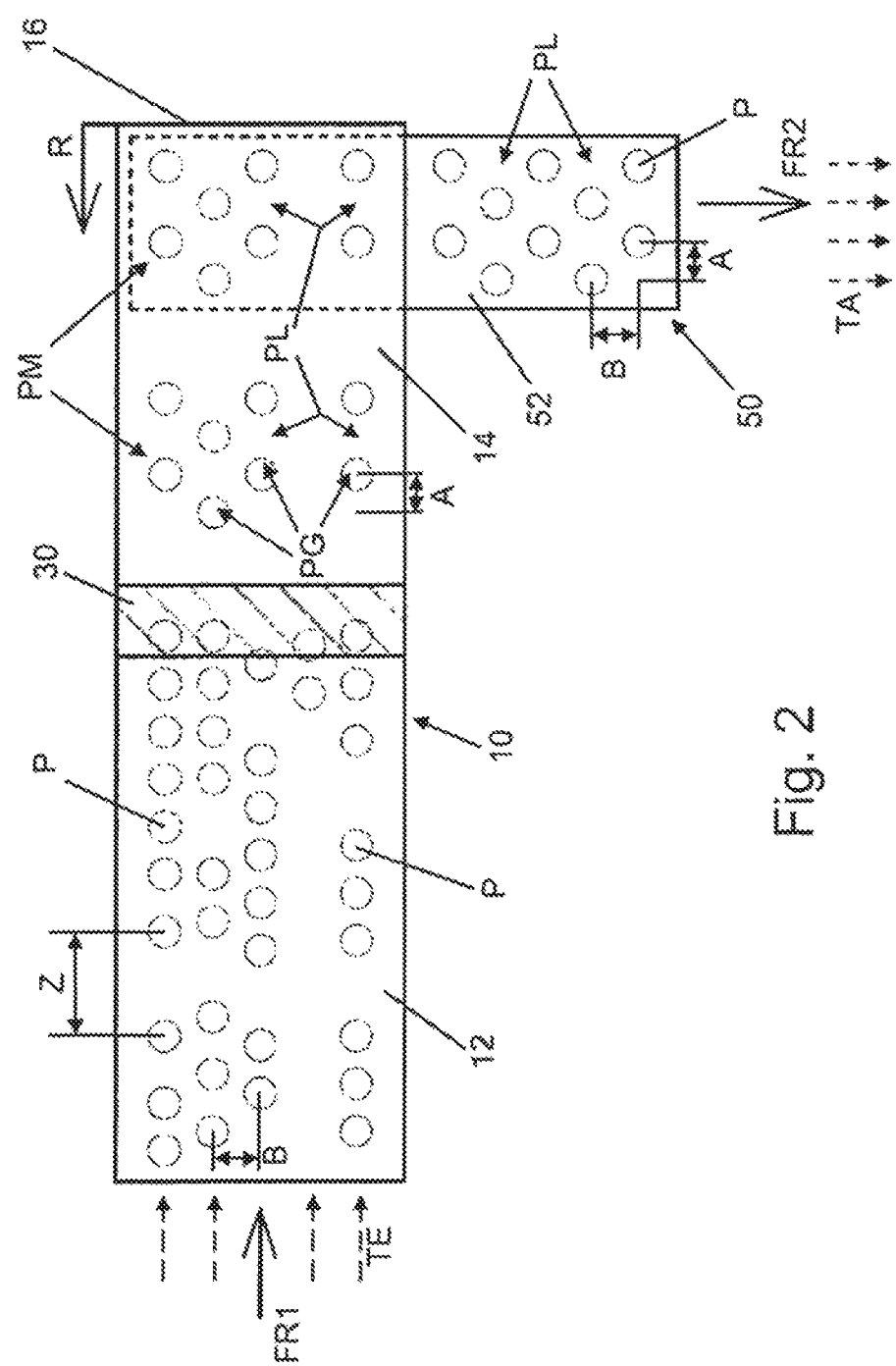

FIG. 2 corresponds to the representation in FIG. 1, the arrangement of the conveyed products, however, being different.

Figure 3:
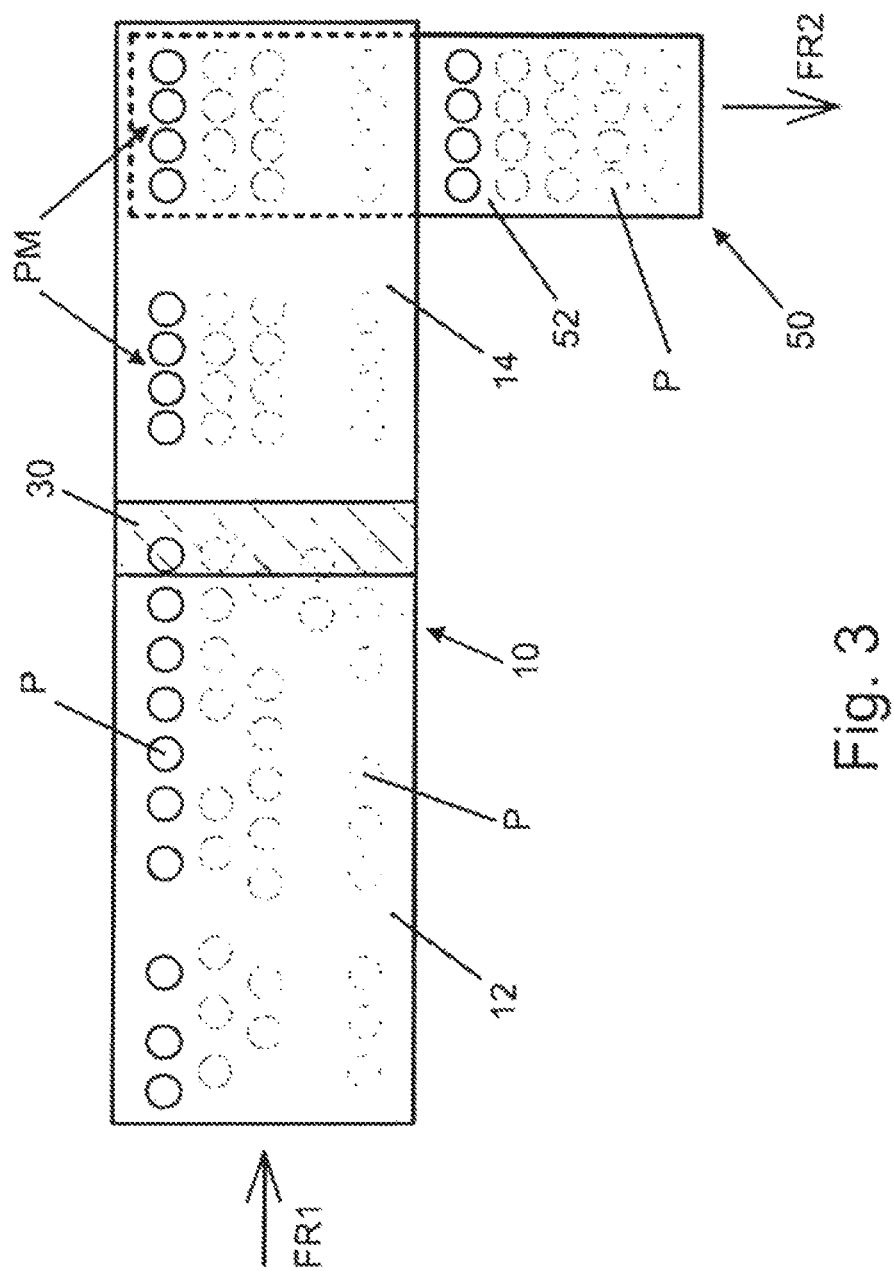

FIG. 3 also corresponds to the representation, in FIG. 1, products with different features or of different quality being conveyed.

As shown in the drawings, the conveying and grouping device consists of a first conveying device 19 and a second conveying device 50 which extends transversely, in particular at right angles thereto. Fragmented products P (for example baked goods, such as biscuits) are conveyed on said conveying devices and are combined to form product groups PG or product matrices PM. and forwarded. The products P are conveyed in a first conveying direction FR1 on the first conveying device 10, and the products P, in particular in each case in the form of a product matrix PM, are conveyed in a second conveying direction FR2 on the second conveying device 50. The second conveying direction FR2, in this case, extends in particular perpendicularly to the first conveying direction FR1 (cf. drawings). The two conveying directions FR1 and FR2, however, can also be arranged obliquely at an angle with respect to one another (not shown in the drawings).

As shown further in the figures, the first conveying device 10 is formed in particular from a first, input-side conveyor belt 12 as well as from a second conveyor belt 14 which is connected downstream of said first conveyor belt. The products P are transferred from the first conveyor belt 12 to the second conveyor belt 14. In the region of said transfer from the first conveyor belt 12 to the second conveyor belt 14 there is arranged a grouping device 30 which comprises devices for engagement in the product flow in order to align the products P which have been supplied more or less in an unordered manner on the first conveyor belt 12 and in particular to combine them to form defined produce groups PG such that the products are able to be forwarded in an ordered, defined arrangement as product group PG or product matrix PM on the second conveyor belt 14.

For this purpose, the grouping device 30 can be formed, for example, by a roller or a circulating chain or belt conveying device, the rotational axis of which is transverse or perpendicular to the conveying direction FR1, FR2. The grouping device 30 comprises circulating, rigid or mobile entrainment means for engagement between two consecutive products P (not shown in the drawings). Over and above this, the grouping device 30 can comprise stopper devices or can interact in a controlled manner with stopper devices that are connected upstream by means of suitable control devices in order, where required, to dam up the products P supplied on the first conveyor belt 12.

The grouping device 30 can be realized in one embodiment substantially as a roller or drum which extends by means of a rigid axis over the entire width of the first conveying device 10. In said case, stopper devices have to be connected upstream of the grouping device 30 on each track of supplied products P in order to accomplish the controlled alignment of the products P for transfer to the second conveyor belt 14.

As an alternative to this, the grouping device 30 can provide a separate, own grouping device for each track of products P supplied on the first conveyor belt 12. In this case, each of said individual grouping devices, in turn, can be a circulating entertainment conveying device, the rotational speed of which is individually controllable for each track. In said case, control devices (including detector or sensor devices, e.g. cameras for monitoring the supplied products) are additionally necessary in order to control the movement of the individual grouping devices of the several product tracks, which are arranged side by side, and to synchronize them with one another in order, as a result, to form a defined multi-track product matrix PM on the second conveyor belt 14. In said case of the individual grouping devices for each track, no stopper devices connected upstream are, as a rule, necessary, as the products on the relevant track are able to be dammed up in a simple manner by stopping the relevant grouping device (occasionally) in a controlled manner. The above-described grouping device is disclosed, for example, in WO 2013/132798A1.

As further shown by the FIGS., the individual products P are transported in the first conveying direction FR1 on the input side on the first conveyor belt 12 on an arbitrary number of tracks TE that are arranged side by side. The individual tracks TE are spaced apart from one another by a spacing B. The products P can be located one behind another on the tracks at arbitrary spacings Z in the conveying direction. In dependence on the processes connected upstream on the input side, individual products can consequently be omitted on the individual tracks TE, or individual tracks can be permanently or at times not filled with any products at all. Thus FIG. 1 shows, as an example, a conveying of products P on five tracks which are arranged side by side, the fourth track calculated from the top in FIG. 1 essentially not being filled with products.

By means of the first conveyor belt 12, the products P are consequently transported on tracks fed the grouping device 30 which dams up and then releases the products P again in a controlled manner, as described above.

As a result of the grouping device 30, the products P on their respective track TE are combined and released in a controlled manner and transferred to the second conveyor belt 14 such that a defined number of products P ere arranged in a group PG behind the grouping device 30 in the conveying direction, wherein products P in said group PG are arranged at defined spacings A one behind another on their respective track in the conveying direction FR1. The product group PG formed in this manner is then forwarded in the conveying direction FR1 by means of the second conveyor belt 14.

Said forming of the product group PG is effected in an identical manner in each of the tracks TE that are arranged side by side. In this case, the forming of the product groups PG on the individual tracks TE is synchronized with one another in such a manner that a defined product matrix PM is formed in the conveying direction FR1 behind the grouping devices 30 of the several tracks. In said product matrix PM, the products P are located one behind another at defined spacings A in the conveying direction on each of the tracks TE and side by side in rows at the spacings B of the tracks TE or at an integer multiple thereof. The product matrix PM is consequently formed by several product groups PG which are located side by side and are aligned with one another.

In FIG. 1 the rows of the formed product matrix PM consequently extend perpendicularly to the conveying direction FR1, whilst the tracks of the formed product matrix PM extend in the conveying direction FR1. The product matrix PM, which is shown in FIG. 1 and is formed by the grouping device 30, consequently consists, in principle, of four rows arranged one behind another and five tracks arranged side by side, consequently therefore of a maximum of 20 individual products P or product positions. In the example shown in the figures, however, the fourth track of the product matrix PM (calculated from the top) is not occupied with products, i.e. said track remains blank here. In this case, there are consequently one or several product gaps or product blank spaces PL. This latter is brought about as a result of no products or too few products having been supplied on said track on the input side in order to form a complete product group PG, i.e. in order to fill the track (now remaining blank) of the product matrix PM completely with products. The products that were supplied (singled-out) on said track on the input side are dammed up by the grouping device 30 until a sufficient number of products P are pending in order to form a complete product group PG or to fill the relevant track of the product matrix PM completely with products. In other words, the relevant track is consequently blocked at times or completely tor product forwarding, i.e. where applicable, products are only conveyed sequentially.

In a corresponding manner, the conveying work of the grouping device 30 or of the individual grouping devices can be controlled and in particular synchronized with one another per track such that the products P are dammed up and then released again by the grouping devices in such a manner that individual, desired or defined positions in the product matrix PM remain free in a targeted manner (product gap PL) or alternatively are occupied with products P. In this way, an individually desired, regular or irregular product matrix PM can be formed with an arbitrarily controllable arrangement of products P. Such a product matrix PM, in which products P alternate with blank spaces PL, is shown schematically in FIG. 2. It is consequently understood that any other arbitrary pattern of the arrangement of products P is also able to be created inside the product matrix PM.

Once the product matrix PM, as described above, has been formed, it is transferred from the first conveying device 10, in particular from the second conveyor belt 14, to the second conveying device 50 for forwarding the products in the second conveying direction FR2 in such a manner that the products P maintain their relative alignment inside each product group PG at the defined spacings A with respect to one another and are then located on the second conveying device 50 essentially side by side in a row.

In the preferred embodiment, where several product tracks TE are arranged side by side on the input side and where a product matrix PM is initially formed (which consists of several product groups PG which are arranged side by side, as has been described above), the product matrix PM is transferred in such a manner to the second conveying device 50 that the products P maintain their relative alignment with respect to one another in the produce matrix PM in such a manner that the products P, which prior to the transfer are arranged side by side in a row in the product matrix PM on the second conveyor belt 14, after the transfer are arranged one behind another in the product matrix PM on a track TA in the second conveying device 50 at defined spacings, said defined spacings corresponding to the spacings B of the individual tracks TE of the first conveying device 10, which are arranged side by side on the input side, or to an integer multiple thereof.

In other words, the spacings at which the products P are arranged one behind another inside the product matrix PM on a track on the second conveying device 50, are dependent on whether the individual positions of a row of the product matrix PM following the grouping device 30 have been occupied by a product or remain blank. In the case of the example shown, in FIG. 1, where the fourth (calculated from the top) track of the product matrix PM has remained blank in the first conveying device 10, in the second conveying device 50 the products P are consequently located one behind another in said region at a spacing 2B on the track of the product matrix PM conveyed on the second conveying device 50. The same applies analogously to the spacing A between the products P which are located side by side in the rows of the product matrix PM in the second conveying device 50.

The transfer of the product matrix PM formed in this manner from the first conveying device 10 to the second conveying device 50 is preferably effected by way of a so-called pull nose belt. In particular, the second conveyor belt 14 of the first conveying device 10 is realized as such a pull nose belt. The second conveyor belt 14, in this case, comprises a front end 16 (or edge) in the first conveying direction FR1 which is arranged in a first position in a region above the second conveying device 50. The second conveying device 50 is located in said overlap region therefore below the first conveying device 10, as is shown by the dotted line in FIG. 1. Proceeding from said end position, the front end 16 of the second conveyor belt 14 can be pulled back in opposition to the first conveying direction FR1, in FIG. 1 therefore to the left in the direction of the arrow R.

The important point here is that said pulling-back movement of the front end 16 of the conveyor belt 14 is effected whilst the conveyer belt 14 continues to convey the products P in the first conveying direction FR1 by means of its circulating movement.

The transfer of the products P to the second conveying device 50 is effected, in this case, in such a manner that the front end 16 of the conveyor belt 14 is pulled back in the direction R, when a complete product group PG or product matrix PM has reached the front end 16 of the conveyor belt 14. As a result of the front belt edge (front end 16) of the conveyor belt 14 being pulled back quickly, the products consequently fall onto a conveyor belt 52 of the second conveying device 50 which is arranged below it. In this connection, in particular all the products inside a product matrix PM fall gradually or more or less simultaneously onto the cross conveyor belt 52 that is arranged below.

In this case, it is important for the products to be placed in such a manner onto the cross conveyor belt 52 that they do not fall in jumbled disarray. Rather, the relative alignment of the products with respect to one another inside the product matrix and in particular the overall form and alignment of the product matrix PM remain unchanged. The product matrix PM can consequently then be transported away in an unchanged form on the transversely extending conveyor belt 52. On account of said transfer of the product matrix PM, the rows of the product matrix on the first conveying device 10 have consequently become tracks TA of the product matrix on the second conveying device 50, and in a corresponding manner, the tracks TE of the product matrix PM on the first conveying device 10 have become rows of the product matrix on the second conveying device 50.

Once the products P have been transferred to the second conveying device 50, the front end 16 of the conveyor belt 14 is advanced forward again out of the pulled-back position (i.e. to the right in FIG. 1 and consequently in opposition to the direction R) into the region above the second conveying device 50. Said advancing movement of the front belt edge 16 is effected quicker than the actual conveying speed of the conveyor belt 14. Consequently, in said phase no products of the products forwarded on the conveyor belt 14 fall onto the cross conveyor belt 52 located below it. In said phase, the products transferred beforehand in the second conveying device 50 or the second conveyor belt 52 are removed out to the side, i.e. in the conveying direction FR2. In this way, space is created on the conveyor belt 52 for the depositing of the next product matrix PM or product group PG transferred by the first conveying device 10.

The pull-back movement of the front end 16 of the conveyor belt 14 (in the direction R) can be supported in an advantageous manner by an up/down movement of the front belt end 16. As a result, the height the products are dropped when transferred from the conveyor belt 14 onto the conveyor belt 52 can be reduced such that to a certain extent the products do not "fall" down from the conveyor belt 14 but rather are carefully placed. In particular, in this connection, the front belt end 16 is lowered when the products are transferred to the conveyor belt 52 and then raised again when it is advanced above the previously deposited products back into the region above the conveyor belt 52 (in opposition to the direction R).

Over and above this, during the transfer of the products P the cross conveyor belt 52 can be brought to a standstill or moved at a constant or a variable speed.

As has already been explained in the introduction, the device according to the invention can be used for the purpose of achieving a regular and/or identical fill level of several product tracks arranged side by side for a process connected downstream on the output side. In order to achieve an identical fill level of products on the output side on all the tracks TA of the cross conveyor belt 52, the grouping device 30 only allows products P on such input-side tracks TE of the first conveyor belt 12 to pass further onto the second conveyor belt 14 of the first conveying device 10 where at least as many products are supplied on the input side as required by the number, provided on the output side, of tracks TA arranged side by side in the product matrix PM. The achievement here is that once the products have been transferred to the second conveying device 50, the identical number of products is present in each track TA on the output side.

As has already been explained above, this is shown as an example in FIG. 1 for the case where produces are consistently missing on the fourth track (calculated from the top) of the first conveyor belt 12 on the input side. The few products that are nevertheless supplied from said track are consequently dammed up by the grouping device 30 and not released for transfer to the second conveyor belt 14 and in particular not released for forming the product matrix PM. Consequently, said track is, as it were, temporarily or completely blocked. Consequently, the products from said track on the input side are also ultimately not deposited onto the cross conveyor belt 52 of the second conveying device 50. As can be seen from FIG. 1, the product matrix PM consequently has a gap or product blank space PL in said region by a complete product row ultimately being missing here inside the matrix PM on the second conveyor belt 52. Said product gap PL on the cross conveyor belt 52, however, is harmless as there is a complete product row present again previously and subsequently in the conveying direction FR2, the products of each of said rows being delivered simultaneously on the output side to the following process step (by being transferred for example into the compartments of a packaging container). Consequently, in spite of an irregular supply of products on the input side, the same number of products are delivered on the output side in each track TA of the second conveying device 50. All in all, a regular fill level of all the tracks TA of the second conveying device 50 is achievable hereby, i.e. to a certain extent a product or track or row correction.

As has been stated above, the grouping devices 30 can operate in such a manner in the individual tracks of the first conveying device 10 for forming the product groups PG or the product matrix PM and be controlled and synchronized with one another by means of suitable control devices such that, in a targeted manner, individual tracks in the product matrix PM are not occupied overall by products, in particular when no products or too few products are supplied for the forming of a complete product group PG in the conveying direction in front of the grouping devices 30 on the relevant tracks. In a corresponding manner, it is possible, in a targeted manner, for individual defined points or positions in the product matrix PM not to be occupied with products such that in each case corresponding product gaps or product blank spaces PL remain at said points, as a result of which overall a defined, regular or irregular product matrix PM is formed. The regular or irregular arrangement, formed in this manner, of the individual products inside a product matrix is maintained, as described above, unchanged when the product matrix is transferred to the second conveying device 50 such that the product matrix PM is then forwarded in said pattern to the second conveying device 50.

Consequently, as a result of suitably controlling and synchronizing the grouping devices 30 in a targeted manner in the individual tracks of the first conveying device 10, the individual tracks of the product matrix PM on the second conveying device 50 can be filled with more or fewer products. In this way, a correction between the products on the individual tracks and a balance or imbalance between the occupations of the individual tracks by products can be created in a targeted manner. The patterns of the product matrix PM which are adjusted in a targeted manner in each case in this way depend on the respective application, in particular on the requirements of the next process step following on the output side. Thus, the products of the second conveying device 50 can be transferred, for example, to a packaging station in which the products are packed individually or in groups by being transferred, for example, into individual compartments of a packaging tray or into a packaging container. In this connection, it can be desired, for example, that, where individual compartments of a packaging container are provided, they can be occupied in each case with one product.

As shown in FIG. 3, it is also possible to mix the products of the different feed tracks using the present invention. When the products P on the individual tracks of the first conveying device 10 on the input side extending side by side have different characteristics, said products can be mixed as a result of the transfer of the products to the second conveying device 50 and as a result of the transversely extending removal of the products. If the products are, for example, baked goods (e.g. biscuits), the individual products can possibly comprise different degrees or browning and/or weights on account of the production process. In FIG. 3 for example the products supplied on the topmost track (when seen from above in FIG. 3) have a high degree of browning, whilst the products supplied on the bottom-most track (when seen from the top in FIG. 3) have a weak degree of browning. Since, as described above, as a result of the transfer from the feed tracks of the first conveying device 10, corresponding rows are developed in the product matrix PM on the second conveying device 50, there is consequently a mixture in the present example of biscuits with a stronger degree of browning and with a lesser degree of browning when the products of one track of the product matrix PM on the second conveying device 50 are delivered into a packaging container or are packaged together in one packaging unit. Such a mixing of the products is in particular sometimes desired in the baked goods sector as more regular weights, for example, or the formed packages can be achieved in this manner.

Over and above this, using the present conveying device, the number of product tracks can be changed from an arbitrary number of tracks TE on the input side on the first conveying device 10 to an arbitrary number of tracks TA on the output side on the second conveying device 50. This is effected, in turn, by suitably controlling and synchronizing the grouping devices 30. Whereas the drawings show a product matrix PM formed by the grouping devices 30 which comprises four rows arranged one behind another in the conveying direction FR1 (each row being arranged perpendicularly to the conveying direction FR1), product matrices with any arbitrary other number of rows can also be formed using the present device. Corresponding to the four rows of the product matrix PM shown in the drawings on the first conveying device 10, four tracks TA arranged side by side are delivered on the output side in the product matrix PM on the second conveying device 50 (each track here extending in turn in the second conveying direction FR2). In a corresponding manner, any other number of input-side and output-side tracks can be realized (e.g. a change from 22 feed tracks on the input side to six output tracks on the output side).

As a result of controlling the grouping devices 30 in a targeted manner, it is additionally possible to only allow products from certain input-side feed tracks TE to pass through for forming the product matrix PM and to be transferred to the second conveying device 50, whilst the products of the other feed tracks are dammed up and held back by the grouping devices 30. Depending on the application, this can be desired once again when the products on the individual feed tracks TE have, for example, different qualities or features and only products of a certain quality are to be allowed through for transfer and delivery on the output side.

In a particular embodiment of the present conveying device, the grouping devices 30 can be omitted. This is possible when, the individual products P are already supplied located side by side in well aligned rows on the input side or when all the tracks on the input side are filled evenly with products or when, apart from this, an even fill level of the individual tracks is not necessary for the delivery of the products on the output side. In said cases, the present device (as described above) can be used in particular for changing the number of tracks (from the tracks on the input side to the tracks on the output side) or for mixing the products of the individual feed tracks for delivery.

LIST OF REFERENCES

P Fragmented product
PG Product group
PM Product matrix
PL Product gap, product blank space
TE Tracks on the input side
TA Tracks on the output side
FR1 First conveying direction
FR2 Second conveying direction
R Pull-back direction of the conveyor belt 14
A Defined spacing between products
B Defined spacing between products, track spacing side by side
Z Distance between products
10 First conveying device
12 First conveyor belt
14 (Second) conveyor belt, pull nose belt
16 Front end of the conveyor belt 14
30 Grouping device
50 Second conveying device
52 Conveyor belt

The invention claimed is:

1. A method for conveying and grouping fragmented products, comprising the steps of:
supplying the fragmented products in a first conveying direction on a track by a first conveying device, wherein the fragmented products are located one behind another at arbitrary spacings on the track in the first conveying direction;
grouping the fragmented products on the first conveying device by a grouping device for the fragmented products at the arbitrary spacings in such a manner that a defined number of products are arranged in a formed product group behind the grouping device in the first conveying direction, wherein the fragmented products in each formed product group are arranged at defined spacings one behind another on the track in the first conveying direction;

forwarding the formed product group in the first conveying direction by means of the first conveying device; and transferring the formed product group from the first conveying device to a second conveying device for forwarding the fragmented products in a second conveying direction in such a manner that the fragmented products maintain their relative alignment at the defined spacings with respect to one another in the formed product group and are essentially located side by side in a row, wherein the first conveying device comprises a first conveyor belt and a second conveyor belt downstream of the first conveyor belt for conveying the fragmented products in the first conveying direction, wherein the second conveyor belt comprises a front end in the first conveying direction which is arranged in a region above the second conveying device and which can be pulled back from here in a direction opposite to the first conveying direction, whilst the second conveyor belt continues conveying the fragmented products in the first conveying direction, wherein the grouping device is arranged at the transfer from the first conveyor belt to the second conveyor belt, wherein the transfer of the fragmented products to the second conveying device is effected as a result of the front end of the second conveyor belt being pulled back when a complete product group or product matrix reaches the front end of the second conveyor belt, and wherein once the fragmented products have been transferred to the second conveying device, the front end of the second conveyor belt is advanced out of the pulled-back position again into the region above the second conveying device.

2. The method as claimed in claim 1, characterized in that the second conveying direction extends perpendicularly to the first conveying direction, and in that when being forwarded in the second conveying direction in the formed product group, the fragmented products are located side by side in a row which extends perpendicularly to the second conveying direction.

3. The method as claimed in claim 1, characterized in that the second conveying direction extends oblique at an angle to the first conveying direction, and in that when being forwarded in the second conveying direction in the formed product group, the fragmented products are located side by side in a row which extends obliquely at an angle to the second conveying direction.

4. The method as claimed in claim 1, characterized in that the fragmented products are supplied by the first conveying device in the first conveying direction on several tracks which are arranged at substantially identical spacings side by side and are substantially parallel to one another, wherein product groups are formed on each track by grouping devices, wherein the forming of the product groups on the individual tracks is synchronized with one another in such a manner that, in the first conveying direction behind the grouping devices of the tracks which are arranged side by side, a defined product matrix is formed in which the fragmented products are arranged on the tracks in the first conveying direction at defined spacings one behind another and in rows side by side at the track spacings or at an integer multiple thereof, and wherein the product matrix formed on the first conveying device is transferred in such a manner to the second conveying device that the fragmented products maintain their relative alignment with respect to one another in the product matrix in such a manner that the fragmented products, which prior to the transfer are arranged side by side in a row in the product matrix in the first conveying device, after the transfer are arranged one behind another in the product matrix on a new track in the second conveying device at defined spacings which correspond to the track spacings of the first conveying device or to an integer multiple thereof.

5. The method as claimed in claim 4, characterized in that the forming of the product groups on the individual tracks on the first conveying device for forming the product matrix is synchronized with one another in such a manner that individual tracks in the product matrix are not occupied by products when no products or too few products for the forming of a complete product group are supplied in front of the grouping devices on the relevant tracks.

6. The method as claimed in claim 4, characterized in that the grouping devices on the individual tracks are controlled and synchronized in such a manner with one another for forming the product matrix that individual defined positions in the product matrix are not occupied by products such that a regular or irregular product matrix is formed which comprises the corresponding product gaps.

7. A device for conveying and grouping fragmented products, comprising:

a first conveying device for supplying the fragmented products in a first conveying direction on a track, wherein the fragmented products are located one behind another at arbitrary spacings on the track in the first conveying direction;

a grouping device on the first conveying device for grouping the fragmented products at the arbitrary spacings in such a manner that a defined number of products are arranged in a formed product group behind the grouping device in the first conveying direction, wherein the fragmented products in the formed product group are arranged at defined spacings one behind another on the track in the first conveying direction, wherein the formed product group is forwarded in the first conveying direction by the first conveying device; and a second conveying device, to which the formed product group is transferred from the first conveying device, for forwarding the fragmented products in a second conveying direction in such a manner that the fragmented products maintain their relative alignment at the defined spacings with respect to one another in the formed product group and are essentially located side by side in a row, wherein the first conveying device comprises a first conveyor belt and a second conveyor belt downstream of the first conveyor belt for conveying the fragmented products in the first conveying direction, wherein the second conveyor belt comprises a front end in the first conveying direction which is arranged in a region above the second conveying device and which can be pulled back from here in a direction opposite to the first conveying direction, whilst the second conveyor belt continues conveying the fragmented products in the first conveying direction, wherein the grouping device is arranged at the transfer from the first conveyor belt to the second conveyor belt, wherein the transfer of the fragmented products to the second conveying device is effected as a result of the front end of the second conveyor belt being pulled back when a complete product group or product matrix reaches the front end of the second conveyor belt, and wherein once the fragmented products have been transferred to the second conveying device, the front end of the second conveyor belt is advanced out of the pulled-back position again into the region above the second conveying device.

8. The device as claimed in claim 7, characterized in that a height of the front end of the second conveyor belt above the second conveying device is variable, wherein during the transfer of the fragmented products to the second conveying device the front end of the second conveyor belt is in a substantially lowered position, and wherein the front end of the second conveyor belt is raised when it is advanced again into the region above the second conveying device after the transfer of the fragmented products to the second conveying device.

9. The device as claimed in claim 7, characterized in that the second conveying device comprises a conveyor belt for conveying the fragmented products in the second conveying direction, wherein during the transfer of the fragmented products to the second conveying device the conveyor belt stands still or is moved at a constant or a variable speed.

10. The device as claimed in claim 7, characterized in that the grouping device comprises a conveying device with circulating entrainment means for engagement between two consecutive fragmented products.

11. The device as claimed in claim 7, characterized in that the grouping device comprises stopper devices for damming up the fragmented products supplied on the first conveying device.

12. The device as claimed in claim 7, characterized in that a separate grouping device is present for each track of products supplied on the first conveying device, wherein control devices for synchronizing the grouping devices of the individual tracks with one another are provided for forming the product matrix.

13. The device as claimed in claim 7, characterized in that the second conveying direction extends perpendicularly to the first conveying direction, and in that when being forwarded in the second conveying direction in the formed product group, the fragmented products are located side by side in a row which extends perpendicularly to the second conveying direction.

14. The device as claimed in claim 7, characterized in that the second conveying direction extends obliquely at an angle to the first conveying direction, and in that when being forwarded in the second conveying direction in the formed product group, the fragmented products are located side by side in a row which extends obliquely at an angle to the second conveying direction.

15. The device as claimed in claim 7, characterized in that the fragmented products are supplied by the first conveying device in the first conveying direction on several tracks which are arranged at substantially identical spacings side by side and are substantially parallel to one another, wherein product groups are formed on each track by grouping devices, wherein the forming of the product groups on the individual tracks is synchronized with one another in such a manner that in the first conveying direction behind the grouping devices of the tracks which are arranged side by side, a defined product matrix is formed in which the fragmented products are arranged on the tracks in the first conveying direction at defined spacings one behind another and in rows side by side at the track spacings or at an integer multiple thereof, and wherein the product matrix formed on the first conveying device is transferred in such a manner to the second conveying device that the fragmented products maintain their relative alignment with respect to one another in the product matrix in such a manner that the fragmented products, which prior to the transfer are arranged side by side in a row in the product matrix in the first conveying device, after the transfer are arranged one behind another in the product matrix on a new track in the second conveying device at defined spacings which correspond to the track spacings of the first conveying device or to an integer multiple thereof.

16. The device as claimed in claim 15, characterized in that the forming of the product groups on the individual tracks on the first conveying device for forming the product matrix is synchronized with one another in such a manner that individual tracks in the product matrix are not occupied by products when no products or too few products for the forming of a complete product group are suppled in front of the grouping devices on the relevant tracks.

17. The device as claimed in claim 15, characterized in that the grouping devices on the individual tracks are controlled and synchronized in such a manner with one another for forming the product matrix that individual defined positions in the product matrix are not occupied by products such that a regular or irregular product matrix is formed which comprises the corresponding product gaps.

* * * * *